Figure 2:
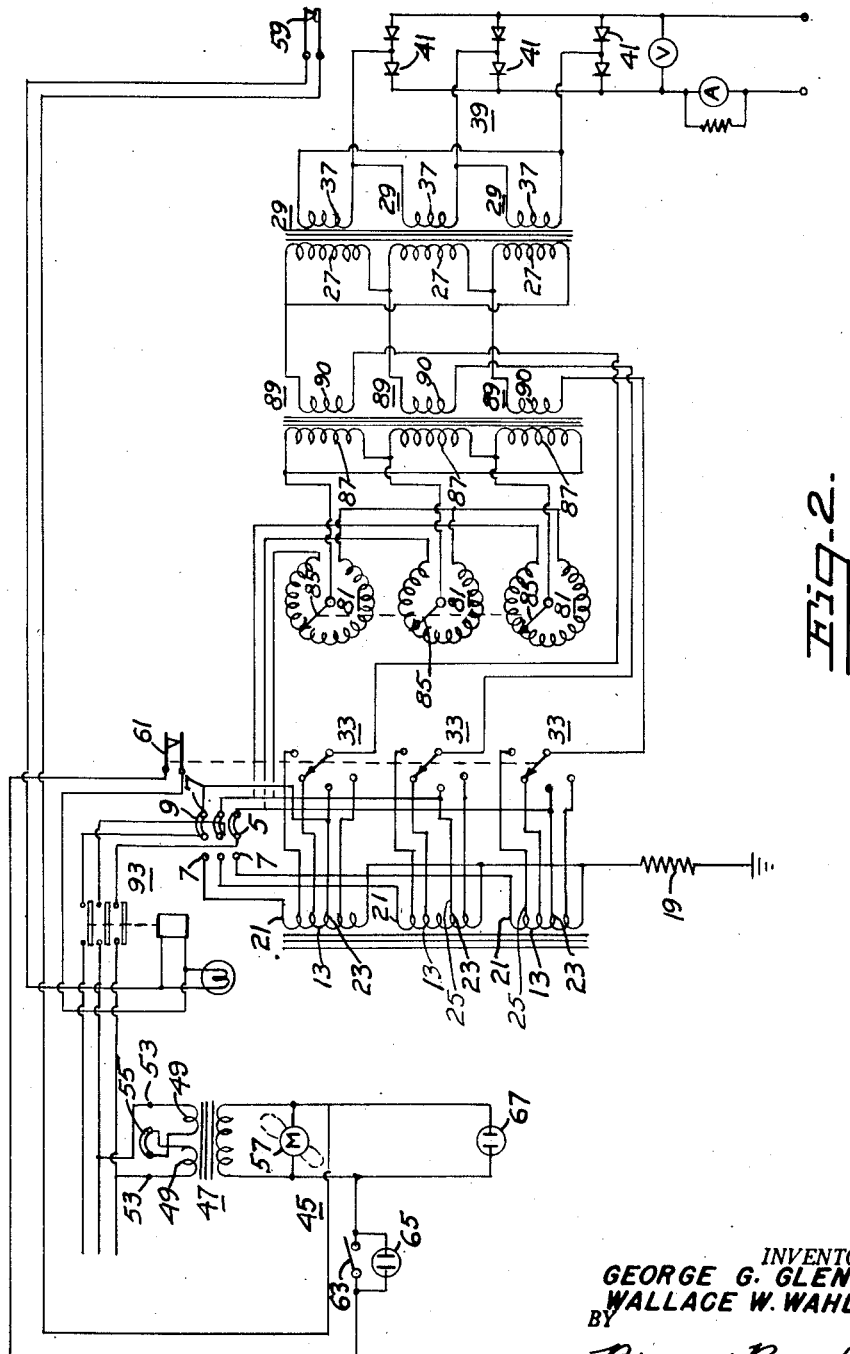

July 23, 1957 G. G. GLENN ET AL 2,800,571
CONSTANT VOLTAGE POWER SUPPLY SYSTEM FOR WELDING EQUIPMENT
Filed May 25, 1953. 4 Sheets-Sheet 1

Fig. 1.

INVENTORS
GEORGE G. GLENN
WALLACE W. WAHLGREN
BY
Bruce & Brosler
THEIR ATTORNEYS INVENTORS
GEORGE G. GLENN
WALLACE W. WAHLGREN
BY
Bruce & Brosler
THEIR ATTORNEYS

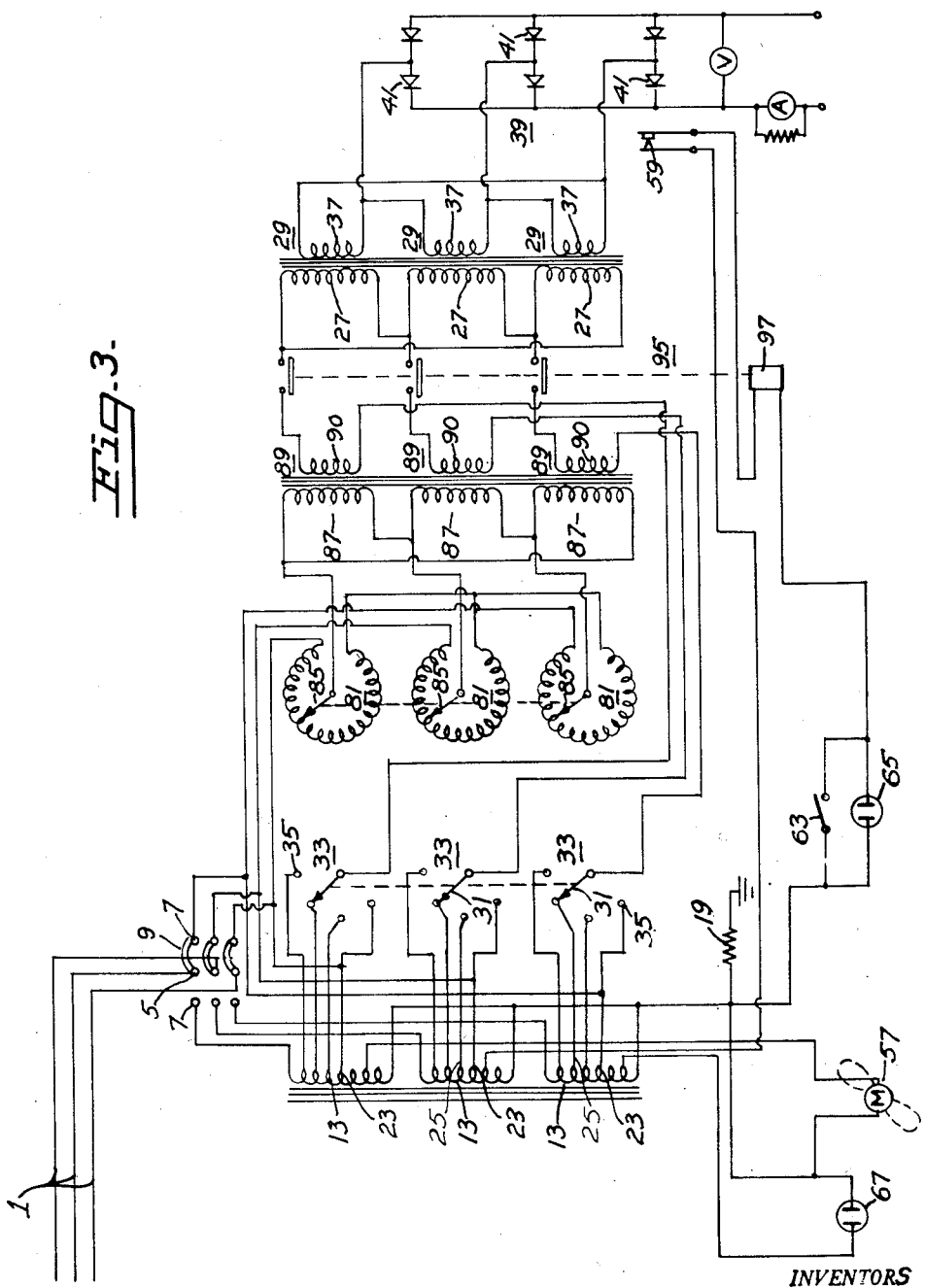

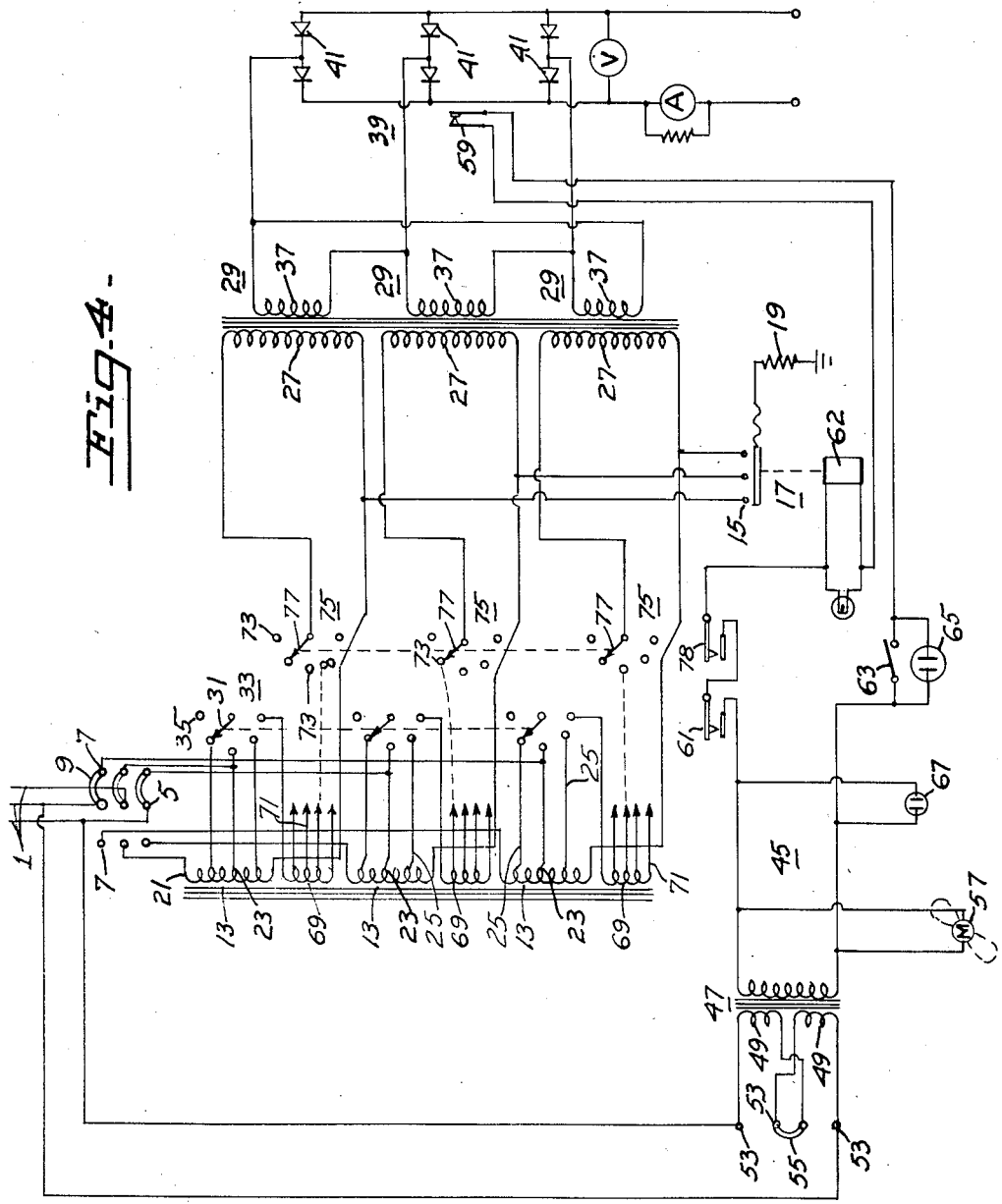

United States Patent Office 2,800,571
Patented July 23, 1957

2,800,571

CONSTANT VOLTAGE POWER SUPPLY SYSTEM FOR WELDING EQUIPMENT

George G. Glenn and Wallace W. Wahlgren, Oakland, Calif., assignors, by direct and mesne assignments, to M & T Welding Products Corporation, San Francisco, Calif., a corporation of California Application May 25, 1953, Serial No. 357,022

17 Claims. (Cl. 219—131)

Our invention relates to the field of welding and more particularly to a power supply system for welding equipment.

Among the objects of our invention are:

1. To provide a novel and improved power supply system for welding equipment and more particularly a system to be used in conjunction with automatic welding apparatus;

2. To provide a novel and improved power supply system for welding equipment which system will maintain a constant voltage across the arc as distinguished from prior systems which alter the arc voltage in an effort to maintain conditions satisfactory for welding purposes;

3. To provide a novel and improved power supply system for welding equipment which requires no external voltage controls;

4. To provide a novel and improved power supply system for welding equipment wherein an arc may be struck almost instantaneously and without necessary recourse to high frequency or use of steel wool;

5. To provide a novel and improved power supply system for welding equipment, such system being characterized by the fact that it has no basic moving parts and is so simple to operate as to require no skilled labor;

6. To provide a novel and improved power supply system for welding equipment which is simple to install and maintain;

7. To provide a novel and improved power supply system for welding equipment which is capable of providing uniformly better welds and at exceptionally high efficiency.

Additional objects of our invention will be brought out in the following description of various forms of the same, taken in conjunction with the drawings, wherein Figures 1, 2, 3 and 4 are representative system diagrams embodying the features and attributes of the present invention.

Referring to the drawings for details of our invention, the power supply systems illustrated in the various figures are all of the three-phase type, and inasmuch as standardized three-phase power systems may be either at 240 volts or 480 volts, this must be taken into consideration in the development of the systems of the present invention, as it is necessary that output or welding voltages be the same regardless of the power line voltage.

With this in mind, the power lines 1 are connected to the center contacts 5 of a switch arrangement involving a similar set of contacts 7 to either side of the center set and a plurality of jumpers 9 adapted to be plugged in to connect each of the center contacts to either of its associated contacts.

The power line voltage is impressed upon the primaries of a plurality of auto-transformers 13, these being preferably connected in Y-formation with the neutral ends connected to normally open contacts 15 of a grounding relay 17, in the ground connection of which there is a resistance 19 preferably of the order of 1000 ohms.

For application of the 480 volts to the primary windings of the auto-transformers, each contact of one of the associated sets of contacts will be connected to the high voltage extremity 21 of one of the primary windings, while in the case of the 240 volt application, each of the contacts of the other associated set will be connected to an intermediate point 23 thereon, representing the 240 volt point when the 480 volts is applied to the primary.

Secondary voltages from each auto-transformer will be derived by means of a plurality of taps 25 including the point 23, such taps being so spaced electrically as to produce changes of the order of two volts between successive taps, as viewed from the load end of the system. Voltages thus originating at the auto-transformers will be applied to the primaries 27 of output step-down transformers 29.

Referring, for the time being, to the system of Figure 1, the secondary tap voltages of each auto-transformer are selectively applicable to the primary winding of an output transformer by connecting one end of each of the primary windings of these output transformers to the neutral connection of the associated auto-transformer, while the other end of each such winding is connected to the contact arm 31 of a tap switch 33 whose contacts 35 correspond in number to, and constitute the terminals of, the secondary voltage taps on the auto-transformers with which it is associated. The tap switches are preferably ganged so as to function in unison.

The secondary windings 37 of the output transformers are preferably delta connected in a full wave rectifier circuit 39 which supplies the resulting direct current voltage to the arc electrodes of a welding head. The step-down ratio of the output transformers is such as to produce a range of welding voltages which, in a commercial embodiment, may be of the order of 22 to 34 volts, as the contact arm negotiates a complete swing over its associated contacts.

While the rectifier components 41 could be of the electron tube type, we prefer the copper oxide or selenium cell type of rectifier for the purpose.

With a power supply system of the above character, it is important to prevent overheating of the rectifier components, in addition to avoiding switching under load conditions, which is apt to occur when the tap switches are of the shorting type.

Accordingly, as a protection against the existence of these two conditions, we provide a single-phase protective and control circuit 45 which may operate directly off one phase of the power lines, as depicted in the system of Figure 1.

This protective and control circuit includes a step-down transformer 47 having a split primary winding 49 of two sections, associated with means for selectively connecting said sections in either a series or parallel arrangement, depending upon the voltage of the power lines.

Such selective connecting means may involve a series of four jumper contacts 53, through the outer ones of which run the connecting lines 54 from the power supply to one end of each primary winding section, while to the intermediate contacts are cross-connected the remaining ends of these primary winding sections.

A jumper 55 connecting the intermediate contacts will accordingly place the two primary winding sections in series, while a pair of jumpers, each connecting one of the intermediate contacts with an end contact will place the two primary winding sections in parallel.

A fan 57 operating off the secondary winding of this transformer, is associated with the rectifier circuit of the system to maintain the same in a cool operating condition. Also associated with the rectifier circuit is a thermal switch 59, while coupled with the tap switches for intermittent operation during switching, is a normally closed micro-switch 61. This micro-switch and thermal switch are connected in series with the actuating coil 62 of the multiple contact relay 17, across the secondary winding of the protective and control circuit transformer 47.

Accordingly, should the fan for some reason or other fail, and the temperature about the rectifiers rise to a dangerous value, say of the order of 145 degrees Fahrenheit, the thermal switch will open the series circuit through the relay coil and cause the relay contacts to open, thereby cutting off the power.

Similarly, while switching, the micro-switch will be opened during movement of the contact arm from one contact to another and cause intermittent opening of the relay contacts, thus removing the power during those brief intervals of time when shorting of the contacts occurs.

This protective and control circuit may be opened and closed manually by means of a panel switch 63 inserted in the circuit, and if such opening and closing of the circuit is desired from an external or remote point, an outlet 65 may be connected across the panel switch.

Also connected across the secondary of the protective and control circuit transformer is an outlet 67 from which power may be taken to run the motor of the welding head.

The system of Figure 4 is along the lines of that of Figure 1, but differs in the manner of obtaining a range of secondary voltages from the auto-transformers.

In this latter system, each auto-transformer has fewer secondary taps, but is provided with a vernier winding 69 which develops a secondary voltage substantially equal to that between taps on the main winding. This vernier winding, itself, is provided with taps 71 representing voltage increments of say two volts as viewed from the load end of the system. These latter taps terminate in the contacts 73 of an auxiliary tap switch 75 having a contact arm 77 connected to the high voltage end of the output transformer primary associated therewith. Thus the secondary voltage taken from the main winding of the auto-transformer is supplemented by that derived from the vernier winding and applied directly to the output transformer.

Like the first tap switches, those connected with the vernier windings are preferably ganged and control a micro-switch 78, which is connected in the protective and control circuit in series with the first micro-switch and thermal switch.

The multiple tap switch arrangement of the system of Figure 4, has the advantage of conveniently providing a wider range of welding voltages, of the order of 20–42 volts for example, in increments of the value desired.

Either of the two foregoing systems, by reason of the step by step change in obtainable load voltages, is best employed in connection with submerged arc welding. For other types of welding, a continuous voltage change characteristic is preferable.

In Figure 2, we have disclosed a system which provides a continuous voltage change characteristic, and at the same time is capable of offering the same welding voltage range, whether coupled to a 480 volt system or a 240 volt system. This system employs an auto transformer and tap switch arrangement similar to that of the system of Figure 1. The tapped voltages, however, are boosted by a continuously variable means having a range comparable to the voltage differential between successive taps.

Such variable voltage component is obtained through a vernier control in the form of a continuously variable autotransformer 81 for each main auto-transformer, the primary windings being Y-connected to the 240 volt taps of said main transformers. Secondary voltage, taken from the primary by a movable contact arm 85, is applied to the primary 87 of a step-down transformer 89 forming part of the booster circuit. The step-down ratio is such as to provide a maximum booster voltage substantially equal to the voltage between taps on the main transformer associated therewith.

The primary windings 87 are Δ-connected, while each secondary winding 90 is connected in series with the secondary of the main transformer, the combined voltage being applied to the primary of the output transformer with three primary windings being preferably Δ-connected.

Inasmuch as the booster voltage is continuously variable, the entire range of secondary voltages offered by the tapped auto-transformers may be altered to take on a continously variable characteristic when applied to the booster transformers 89.

The continuously variable auto-transformers are preferably ganged to assure uniformity in the functioning of the three phases of the system.

Since opening of the neutral ground connection in this system will still leave the load connected through the booster circuit, opening of this ground connection in response to switching as was done in the systems of Figures 1 and 4, will serve no good purpose. Accordingly, a three phase contactor 93 is utilized in the main power lines to remove the power during switching.

Represented in Figure 3 is another embodiment of the invention providing continuously variable welding voltage.

By employing non-shorting type tap switches, it is not necessary to interrupt the power supply during switching. It becomes feasible therefore in protecting the rectifier circuit against overheating, to disconnect the power supply to the rectifier circuit by opening the connections between the booster transformers 89 and the output transformers 29. A three phase contactor 95 having its winding 97 in series with the thermal switch will serve this purpose.

The protective and control circuit in this embodiment, is split up among the three phases of the system by apportioning the parallel branches of this circuit among the main auto-transformers. Thus the series connected thermal switch 59 and contactor coil 97 obtain their operating voltage from a 110 volt tap on one transformer, the fan 57 from another, and the 110 volt outlet 67 from the remaining transformer.

While throughout the description of the various embodiments of the invention, considerable discussion was directed to variability of the voltages in the systems, it must be borne in mind that this relates to manual adjustments of the system voltages, for once an adjustment is made, the voltage remains substantially constant. This constancy of voltage is very important in distinguishing applicants' systems from practically all prior art systems in current use.

Aside from the fan, which is an essential though not a basic component of the systems of the present invention, the systems employ no moving parts in supplying proper operating voltage to welding equipment, and inasmuch as the systems are made up largely of transformers, which function at exceedingly high efficiency and power factor, the systems themselves, operate at high efficiency and high power factor, both under no load and full load conditions.

The foregoing features and characteristics make the equipment incorporating such voltage supply systems readily installable and readily operable without the need for skilled labor.

The systems, it is noted, are devoid of voltage controls, as the same are not required inasmuch as the welding voltage remains constant within the requirements of high quality welding. This is so, in view of the large step down ratios between the power line voltage and the obtained welding voltage, for it will be appreciated that with such high step down ratios, normal fluctuations in power line voltage within the narrow limits controlled by the power companies, the corresponding change in the welding voltage would hardly be noted. Thus, for example, a two volt change in a 480 volt power line, would manifest itself as a change of only one-twelfth of a volt in the welding voltage when functioning at 20 volts. For all intents and purposes, therefore, the systems are inherently constant voltage systems. Inherent in the functioning of applicants' power supply system is its ability to develop an exceedingly high short circuit current and achieve a fast recovery to normal welding current, all within a small fraction of a second, of the order of 1/10 of a second. The significance of this lies in the fact that the high short circuit current will burn off the tip of the electrode in time to initiate an arc before undue undercutting or deposit of metal can occur. As a concrete example of the inherent operating characteristic of applicants' power supply system, reference may be made to the publication, "Effect of Power Supply Characteristics on Sigma Welding," published by Linde Air Products Company. Among power supply systems analyzed and compared in this publication is applicants' constant voltage power supply, its starting characteristics being depicted in an oscilloscope trace (Figure 9 of the publication). The equipment, designed to function at normal welding current of the order of 500 amperes, was shown to develop a short circuit current peak of 1200 amperes and recover within the exceedingly brief time of .092 second.

By reason of the foregoing starting characteristics, an operator can safely proceed with his welding, immediately upon contact of the electrode with the work, thereby eliminating the prior necessity of withdrawing the electrode to strike an arc, as is required with conventional equipment. Such inherent characteristics of applicants' constant voltage power supply system is attributable primarily to two factors, namely, (1) the substantially complete absence of inductive reactance from the system, and (2) the reliance upon rectifiers of the semi-conductive type to convert the alternating current to direct current.

Applicants' constant voltage power supply system, furthermore, because of its ability to maintain constancy of voltage selected for welding, now makes it possible to set the rate of feed of a motor driven electrode with assurance that subsequent adjustments in the rate of feed will not have to be made.

This is explainable by the fact that the constant voltage maintained by the supply source, compels the existence of a constant voltage drop across the arc. Assuming the distance between the electrode and work to decrease, the resistance of the arc path will decrease and the arc current will increase to maintain the constant voltage drop across the arc. The increase in current results in a faster consumption of the electrode to re-establish the previous arc length and without altering the rate of electrode feed. Conversely, should the arc distance increase, resulting in an increase in resistance of the arc path, the maintained voltage drop across the arc, will force a decrease in arc current with a corresponding decrease in rate of consumption of the electrode. With a maintained rate of feed of the electrode, it will therefore shorten the arc length to re-establish the desired arc. Thus, due entirely to the constant voltage characteristic of applicants' power supply system, the arc, in motor driven electrode apparatus, becomes selfadjusting while the feed rate is maintained constant.

The inherent favorable characteristics of our invention makes possible the practice of stud welding along highly efficient and practical lines. The stud is brought into contact with the surface to which it is to be welded and then withdrawn to establish an arc, which results in a pool of molten metal being established at the point of contact. Welding is completed by returning the stud to the point of initial contact and permitting the molten metal to solidify.

Due to the absence of both mechanical and electrical inertia in the components of a system embodying our inventive teachings, and the ability to maintain substantial constancy of welding voltage despite current surges, a perfect weld is assured in every instance.

From the foregoing description of our invention in its various embodiments, it becomes apparent that the same fulfills all the objects attributable thereto, and because the same is capable of additional alteration and modification without departing from the underlying principles involved, we do not desire to be limited in our protection to the details illustrated and described except as may be necessitated by the appended claims.

We claim:

1. A power supply system for welding equipment having a motor driven electrode, comprising a plurality of auto-transformers, corresponding in number to the number of phases in a power line to which the same is to be connected, each of said auto-transformers having means associated therewith to provide a selection of secondary voltages, and means for adjusting the number of turns on the input side of each of said auto-transformers to obtain the same selection of secondary voltages for differently rated power lines, means for reducing said secondary voltages to a range of voltage values suitable for welding, and means for rectifying in a common output circuit, the reduced voltages derived from said plurality of auto-transformers, said rectifier means including rectifier components of the semi-conductive type and said power supply system being substantially devoid of inductive reactance, whereby recovery will be realized in time to permit welding without withdrawal of the electrode or undue undercutting or deposit of metal and whereby such motor driven electrode may be driven at a substantially constant rate.

2. A power supply system for welding equipment, comprising a plurality of transformers, corresponding in number to the number of phases in a power line to which the same is to be connected, each of said transformers having a plurality of secondary voltage connections, means for connecting said transformers to a multi-phase power line, a plurality of output step-down transformers corresponding in number to the number of line transformers, means for applying to the primary of each of said output transformers, a voltage derived from one of said line transformers, means for rectifying in a common output circuit, the output voltage of each of said output transformers, contactor means for disconnecting power from the system in response to the occurrence of a predetermined condition therein, said contactor means including a relay having normally open contacts in power conveying connections associated with said system, and a relay winding for closing said contacts while energized, and a protective and control circuit for energizing said relay winding during normal operating conditions of said system and de-energizing the same upon occurrence of said predetermined condition, said protective and control circuit involving a transformer having a primary winding and a secondary winding, a normally closed thermal switch in the region of said rectifying means and openable in response to temperature developed therein above a predetermined safe operating value, and a secondary circuit for said control circuit transformer including said relay winding, and said thermal switch in series.

3. A power supply system for welding equipment comprising a plurality of transformers, corresponding in number to the number of phases in a power line to which the same is to be connected, each of said transformers having a plurality of secondary voltage connections, means for connecting said transformers to a multi-phase power line, a plurality of output step-down transformers corresponding in number to the number of line transformers, means for applying to the primary of each of said output transformers, a voltage derived from one of said line transformers, said means including a tap switch for each of said line transformers, each tap switch involving a series of contacts and a contact arm adapted to sequentially engage each of said contacts, means connecting each of the secondary voltage connections of each of said line transformers to a different contact on the associated tap switch, a connection from the contact arm of said switch to one end of the primary of one of said output transformers and a connection from a fixed point on the associated line transformer to the opposite end of said output transformer primary winding, means for rectifying in a common output circuit, the output voltage of each of said output transformers, contactor means for disconnecting power from the system in response to the occurrence of a predetermined condition therein, said contactor means including a relay having normally open contacts in power conveying connections associated with said system, and a relay winding for closing said contacts while energized, and a protective and control circuit for energizing said relay winding during normal operating conditions of said system and de-energizing the same upon occurrence of said predetermined condition, said protective and control circuit involving a transformer having primary winding and a secondary winding, means for connecting said primary winding to a phase of said power line, a normally closed thermal switch in the region of said rectifying means and openable in response to temperature developed therein above a predetermined safe operating value, and a secondary circuit for said control circuit transformer including said relay winding, and said thermal switch in series.

4. A power supply system for welding equipment, comprising a plurality of auto-transformers, corresponding in number to the number of phases in a power line to which the same is to be connected, each of said auto-transformers having a plurality of taps to provide a selection of secondary voltages, means for adjusting the primary of each of said auto-transformers to obtain the same selection of secondary voltages for differently rated power lines, means for connecting said auto-transformers to a multi-phase power line, a plurality of output step-down transformers corresponding in number to the number of auto-transformers, means for applying to the primary of each of said output transformers, a voltage derived from one of said auto-transformers, said means including a tap switch for each of said auto-transformers, each tap switch involving a series of contacts and a contact arm adapted to sequentially engage each of said contacts, means connecting each of the secondary voltage taps of each of said auto-transformers to a different contact on the associated tap switch, a connection from the contact arm of said switch to one end of the primary of one of said output transformers and a connection from a fixed point on the associated auto-transformer to the opposite end of said output transformer primary winding, means for rectifying in a common output circuit, the output voltage of each of said output transformers, contactor means for disconnecting power from the system in response to the occurrence of a predetermined condition therein, said contactor means including a relay having normally open contacts in power conveying connections associated with said system, and a relay winding for closing said contacts while energized, and a protective and control circuit for energizing said relay winding during normal operating conditions of said system and de-energizing the same upon occurrence of said predetermined condition, said protective and control circuit involving a transformer having a split primary winding of two sections and a secondary winding, means for selectively connecting said primary sections in series or parallel to a phase of said power line, a normally closed thermal switch in the region of said rectifying means and openable in response to temperature developed therein above a predetermined safe operating value, and a secondary circuit for said control circuit transformer including said relay winding, and said thermal switch in series.

5. A power supply system for welding equipment, comprising a plurality of auto-transformers, corresponding in number to the number of phases in a power line to which the same is to be connected, each of said auto-transformers having a plurality of taps to provide a selection of secondary voltages, means for adjusting the primary of each of said auto-transformers to obtain the same selection of secondary voltages for differently rated power lines, means for connecting said auto-transformers to a multi-phase power line, a plurality of output step-down transformers corresponding in number to the number of auto-transformers, means for applying to the primary of each of said output transformers, a voltage derived from one of said auto-transformers, said means including a tap switch for each of said auto-transformers, each tap switch involving a series of contacts and a contact arm adapted to sequentially engage each of said contacts, means connecting each of the secondary voltage taps of each of said auto-transformers to a different contact on the associated tap switch, a connection from the contact arm of said switch to one end of the primary of one of said output transformers and a connection from a fixed point on the associated auto-transformer to the opposite end of said output transformer primary winding, means for rectifying in a common output circuit, the output voltage of each of said output transformers, contactor means for disconnecting power from the system in response to the occurrence of predetermined conditions therein, said contactor means including a relay having normally open contacts in power conveying connections associated with said system, and a relay winding for closing said contacts while energized, and a protective and control circuit for energizing said relay winding during normal operating conditions of said system and de-energizing the same upon occurrence of said predetermined conditions, said protective and control circuit involving a transformer having a split primary winding of two sections and a secondary winding, means for selectively connecting said primary sections in series or parallel to a phase of said power line, a normally closed thermal switch in the region of said rectifying means and openable to open in response to temperature developed therein above a predetermined safe operating value, a normally closed micro-switch associated with said tap switches and openable in response to movements of said contact arms between contacts thereon, and a secondary circuit for said control circuit transformer including said relay winding, said thermal switch and said micro-switch in series.

6. A power supply system for welding equipment comprising a plurality of auto-transformers, corresponding in number to the number of phases in a power line to which the same is to be connected, each of said auto-transformers having a plurality of taps to provide a selection of secondary voltages, means for adjusting the primary of each of said auto-transformers to obtain the same selection of secondary voltages for differently rated power lines, means for connecting said auto-transformers to a multi-phase power line, a plurality of output step-down transformers corresponding in number to the number of auto-transformers, means for applying to the primary of each of said output transformers, a voltage derived from one of said autotransformers, said means including a tap switch for each of said auto-transformers, each tap switch involving a series of contacts and a contact arm adapted to sequentially engage each of said contacts, means connecting each of the secondary voltage taps of each of said auto-transformers to a different contact on the associated tap switch, variable means associated with each of said auto-transformers for providing a vernier voltage having a maximum value of the order of the voltage between taps on said auto-transformers, said means including a transformer having a secondary winding, a connection from the contact arm of the tap switch to one end of the primary of one of said output transformers, said last connection including the secondary winding of one of said variable means, and means for rectifying in a common output circuit, the output voltage of each of said output transformers.

7. A power supply system for welding equipment, comprising a plurality of auto-transformers, corresponding in number to the number of phases in a power line to which the same is to be connected, each of said auto-transformers having a plurality of taps to provide a selection of secondary voltages, means for adjusting the primary of each of said auto-transformers to obtain the same selection of secondary voltages for differently rated power lines, means for connecting said auto-transformers to a multi-phase power line, a plurality of output step-down transformers corresponding in number to the number of auto-transformers, means for applying to the primary of each of said output transformers, a voltage derived from one of said auto-transformers, said means including a tap switch for each of said auto-transformers, each tap switch involving a series of contacts and a contact arm adapted to sequentially engage each of said contacts, means connecting each of the secondary voltage taps of each of said auto-transformers to a different contact on the associated tap switch, continuously variable means associated with each of said auto-transformers for providing a vernier voltage having a maximum value of the order of the voltage between taps on said auto-transformers, said means including a transformer having a secondary winding, a connection from the contact arm of said switch to one end of the primary of one of said output transformers, said last connection including the secondary winding of one of said continuously variable means, and means for rectifying in a common output circuit, the output voltage of each of said output transformers.

8. A power supply system for welding equipment, comprising a plurality of auto-transformers, corresponding in number to the number of phases in a power line to which the same is to be connected, each of said auto-transformers having a plurality of taps to provide a selection of secondary voltages, means for adjusting the primary of each of said auto-transformers to obtain the same selection of secondary voltages for differently rated power lines, means for connecting said auto-transformers to a multi-phase power line, a plurality of output step-down transformers corresponding in number to the number of auto-transformers, means for applying to the primary of each of said output transformers, a voltage derived from one of said auto-transformers, said means including a tap switch for each of said auto-transformers, each tap switch involving a series of contacts and a contact arm adapted to sequentially engage each of said contacts, means connecting each of the secondary voltage taps of each of said auto-transformers to a different contact on the associated tap switch, continuously variable means associated with each of said auto-transformers for providing a vernier voltage having a maximum value of the order of the voltage between taps on said auto-transformers, said means including a transformer having a secondary winding, a connection from the contact arm of said switch to one end of the primary of one of said output transformers, said last connection including the secondary winding of one of said continuously variable means, means for rectifying in a common output circuit, the output voltage of each of said output transformers, contactor means for disconnecting power from the system in response to the occurrence of predetermined condition therein, said contactor means including a relay having normally open contacts in power conveying connections associated with said system, and a relay winding for closing said contacts while energized, and a protective and control circuit for energizing said relay winding during normal operating conditions of said system and de-energizing the same upon occurrence of said predetermined condition, said protective and control circuit involving a transformer having a split primary winding of two sections and a secondary winding, means for selectively connecting said primary sections in series or parallel to a source of power, a normally closed thermal switch in the region of said rectifying means and openable in response to temperature developed therein above a predetermined safe operating value, and a secondary circuit for said control circuit transformer including said relay winding, and said thermal switch.

9. A power supply system for welding equipment having a motor driven electrode, comprising a transformer, said transformer having means for providing a selection of secondary voltages, means for adjusting the number of turns on the input side of said transformer to obtain the same selection of secondary voltages for differently rated power lines to which the same may be connected, means for reducing said secondary voltages to a range of voltage values suitable for welding, and means for rectifying said voltages of reduced value, said last means including rectifier components of the semi-conductive type and said power supply system being substantially devoid of inductive reactance, whereby recovery will be realized in time to permit welding without withdrawal of the electrode or undue undercutting or deposit of metal and whereby such motor driven electrode may be driven at a substantially constant rate.

10. A power supply system for welding equipment, comprising an auto-transformer, said auto-transformer having a plurality of taps to provide a selection of secondary voltages, means for adjusting the primary of said auto-transformer to obtain the same selection of secondary voltages for differently rated power lines to which the same may be connected, means for connecting said auto-transformer to a power line, an output step-down transformer, means for applying to the primary of said output transformer, a voltage derived from said auto-transformer, said means including a tap switch involving a series of contacts and a contact arm adapted to sequentially engage each of said contacts, means connecting each of the secondary voltage taps of said auto-transformer to a different contact on the associated tap switch, continuously variable means for providing a vernier voltage, said means including a transformer secondary, a connection from the contact arm of said switch to one end of the primary of said output transformer, said connection including said transformer secondary, and means for rectifying the output voltage of said output transformer.

11. A power supply system for welding equipment, comprising an auto-transformer, said auto-transformer having a plurality of taps to provide a selection of secondary voltages, means for adjusting the primary of said auto-transformer to obtain the same selection of secondary voltages for differently rated power lines to which the same may be connected, means for connecting said auto-transformer to a power line, an output step-down transformer, means for applying to the primary of said output transformer, a voltage derived from said auto-transformer, said means including a tap switch involving a series of contacts and a contact arm adapted to sequentially engage each of said contacts, means connecting each of the secondary voltage taps of said auto-transformer to a different contact on the associated tap switch, variable means for providing a vernier voltage, said means including a transformer secondary, a connection from the contact arm of said switch to one end of the primary of said output transformer, said connection including said transformer secondary, means for rectifying the output voltage of said output transformer, contactor means for disconnecting power from the system in response to the occurrence of a predetermined condition therein, said contactor means including a relay having normally open contacts in a power conveying connection associated with said system, and a relay winding for closing said contacts while energized, and a protective and control circuit for energizing said relay winding during normal operating conditions of said system and de-energizing the same upon occurrence of said predetermined condition, said protective and control circuit involving a transformer having a primary winding and a secondary winding, a normally closed thermal switch in the region of said rectifying means and openable in response to temperature developed therein above a predetermined safe operating value, and a secondary circuit for said control circuit transformer including said relay winding, and said thermal switch in series.

12. A power supply system for welding equipment, comprising an auto-transformer, said auto-transformer having a plurality of taps to provide a selection of secondary voltages, means for adjusting the primary of said auto-transformer to obtain the same selection of secondary voltages for differently rated power lines to which the same may be connected, means for connecting said auto-transformer to a power line, an output step-down transformer, means for applying to the primary of said output transformer, a voltage derived from said auto-transformer, said means including a tap switch involving a series of contacts and a contact arm adapted to sequentially engage each of said contacts, means connecting each of the secondary voltage taps of said auto-transformer to a different contact on the associated tap switch, continuously variable means for providing a vernier voltage, said means including a transformer secondary, a connection from the contact arm of said switch to one end of the primary of said output transformer, said connection including said transformer secondary, means for rectifying the output voltage of said output transformer, contactor means for disconnecting power from the system in response to the occurrence of predetermined conditions therein, said contactor means including a relay having normally open contacts in a power conveying connection associated with said system, and a relay winding for closing said contacts while energized, and a protective and control circuit for energizing said relay winding during normal operating conditions of said system and de-energizing the same upon occurrence of said predetermined conditions, said protective and control circuit involving a transformer having a primary winding and a secondary winding, a normally closed thermal switch in the region of said rectifying means and openable in response to temperature developed therein above a predetermined safe operating value, a normally closed micro-switch associated with said tap switch and openable in response to movements of said contact arm between contacts thereon, and a secondary circuit for said control circuit transformer including said relay winding, said thermal switch and said micro-switch in series.

13. A power supply system for welding equipment having a motor driven electrode, comprising transformers corresponding in number to the number of phases in a power line to which the same is to be connected, means for rectifying the voltage derived from such transformers, said rectifier including rectifier components of the semi-conductive type and said power supply system being substantially devoid of inductive reactance, and means for adjusting the number of turns on the input side of each such transformer to obtain the same rectified voltage for differently rated power lines, whereby recovery will be realized in time to permit welding without withdrawal of the electrode or undue undercutting or deposit of metal and whereby such motor driven electrode may be driven at a substantially constant rate.

14. A power supply system for welding equipment having a motor driven electrode, comprising a plurality of transformers, corresponding in number to the number of phases in a power line to which the same is to be connected, each of said transformers having a plurality of taps to provide a selection of secondary voltages, and means for adjusting the number of turns on the input side of each of said transformers to obtain the same selection of secondary voltages for differently rated power lines, means for reducing said secondary voltages to a range of voltage values suitable for welding, and means for rectifying in a common output circuit, the reduced voltages derived from said plurality of transformers, said rectifier means including rectifier components of the semi-conductive type and said power supply system being substantially devoid of inductive reactance, whereby recovery will be realized in time to permit welding without withdrawal of the electrode or undue undercutting of metal and whereby such electrode may be driven at a substantially constant rate.

15. In combination, welding equipment including a motor driven electrode; and a power supply system therefor comprising, a transformer, said transformer having means providing a selection of secondary voltages, means for reducing said secondary voltages to a range of voltage values of the order of twenty to forty-two volts, and means for rectifying such voltages of reduced value, said rectifying means including rectifier components of the semi-conductive type and said power supply system being substantially devoid of inductive reactance, whereby recovery will be realized in time to permit welding without withdrawal of the electrode or undercutting or deposit of metal.

16. In combination, welding equipment including a motor driven electrode; and a power supply system therefor comprising, line transformers corresponding in number to the number of phases in a power line to which the same is to be connected, said transformers each having means providing a plurality of secondary voltages, output step-down transformers corresponding in number to the number of line transformers, means for applying to the primary of each such output transformer, a voltage derived from a corresponding line transformer, and means for rectifying such derived voltages, said rectifying means including rectifier components of the semi-conductive type and said power supply system being substantially devoid of inductive reactance, whereby recovery will be realized in time to permit welding without withdrawal of the electrode or undue undercutting or deposit of metal.

17. A power supply system for welding equipment having a motor driven electrode, comprising a transformer, means for selectively deriving from said transformer, voltages within a range of welding voltages, means for rectifying such selectable welding voltages, said rectifier means including rectifier components of the semi-conductive type and said power supply system being substantially devoid of inductive reactance, whereby recovery will be realized in time to permit welding without withdrawal of the electrode or undue undercutting or deposit of metal and whereby such motor driven electrode may be driven at a substantially constant rate.

References Cited in the file of this patent
UNITED STATES PATENTS

| Number | Name | Date |
|---|---|---|
| 1,110,590 | Thomas | Sept. 15, 1914 |
| 1,157,823 | Thomas | Oct. 26, 1915 |
| 1,452,857 | Uphoff | Apr. 24, 1923 |
| 1,817,084 | Keller | Aug. 4, 1931 |
| 1,903,451 | Greco | Apr. 11, 1933 |
| 1,959,513 | Weyandt | May 22, 1934 |
| 1,961,153 | Lazarus | June 5, 1934 |
| 2,068,883 | Klinkhamer | Jan. 26, 1937 |
| 2,171,512 | Crout | Aug. 29, 1939 |
| 2,367,943 | Hein | Jan. 23, 1945 |
| 2,430,055 | Kennedy | Nov. 4, 1947 |
| 2,444,834 | Landis et al. | July 6, 1948 |
| 2,462,882 | Martin | Mar. 1, 1949 |
| 2,491,479 | Dash | Dec. 20, 1949 |
| 2,719,946 | Riley | Oct. 4, 1955 |